(12) United States Patent
Andersen

(10) Patent No.: US 10,158,796 B2
(45) Date of Patent: Dec. 18, 2018

(54) ADAPTIVE AUTOFOCUSING SYSTEM

(71) Applicant: Phase One A/S, Frederiksberg (DK)

(72) Inventor: Thomas Andersen, Køge (DK)

(73) Assignee: PHASE ONE A/S, Frederiksberg (DK)

(*) Notice: Subject to any disclaimer, the term of this patent is extended or adjusted under 35 U.S.C. 154(b) by 0 days.

(21) Appl. No.: 15/167,492

(22) Filed: May 27, 2016

(65) Prior Publication Data

US 2016/0353006 A1 Dec. 1, 2016

(30) Foreign Application Priority Data

May 29, 2015 (EP) .................................. 15169848

(51) Int. Cl.
| | |
|---|---|
| *H04N 5/232* | (2006.01) |
| *G02B 7/34* | (2006.01) |
| *G03B 13/36* | (2006.01) |
| *H04N 5/369* | (2011.01) |
| *H04N 5/374* | (2011.01) |
| *H04N 17/00* | (2006.01) |
| *G02B 7/36* | (2006.01) |

(52) U.S. Cl.
CPC ........... *H04N 5/23212* (2013.01); *G02B 7/34* (2013.01); *G03B 13/36* (2013.01); *H04N 5/3696* (2013.01); *H04N 5/374* (2013.01); *H04N 17/002* (2013.01); *G02B 7/36* (2013.01)

(58) Field of Classification Search
CPC .. H04N 5/23212; H04N 5/3696; H04N 5/374; H04N 17/002; G02B 7/34; G03B 13/36
See application file for complete search history.

(56) References Cited

U.S. PATENT DOCUMENTS

| | | | |
|---|---|---|---|
| 6,088,537 A | 7/2000 | Ohtaka et al. | |
| 6,297,909 B1 | 10/2001 | Sensui | |
| 6,360,059 B1 | 3/2002 | Ide et al. | |
| 6,577,344 B2 | 6/2003 | Kadohara et al. | |
| 8,508,652 B2* | 8/2013 | Albu .................. | H04N 5/23212 348/208.1 |
| 8,680,451 B2 | 3/2014 | Iwane | |
| 8,860,860 B2* | 10/2014 | Inoue ................. | H04N 5/23212 348/297 |
| 9,124,830 B2* | 9/2015 | Ogura .................... | H04N 5/361 |

(Continued)

FOREIGN PATENT DOCUMENTS

| | | |
|---|---|---|
| WO | WO 2010/101096 A1 | 9/2010 |
| WO | WO 2014/038258 A1 | 3/2014 |

OTHER PUBLICATIONS

European Search Report for EP 15 16 9848 dated Oct. 7, 2015.

*Primary Examiner* — Nicholas G Giles
(74) *Attorney, Agent, or Firm* — Knobbe, Martens, Olson & Bear LLP

(57) ABSTRACT

The invention relates to a phase-detection autofocus system using a single two-dimensional (2D) image sensor as an autofocus sensor. This allows for a number of novel functionalities such as calibration by adaptive selection of pixels for the autofocus collection zone, dynamically optimization of the collection zone for various scene and lightning conditions, as well as the use of 2D phase signals in the cross-correlation. This freedom in selecting which pixels to use gives rise to an equivalent freedom for the focus points presented to the user, which can be created, moved and scaled according to the conditions and the scene.

14 Claims, 10 Drawing Sheets

(56) References Cited

U.S. PATENT DOCUMENTS

| | | | |
|---|---|---|---|
| 2010/0013947 A1* | 1/2010 | Oikawa | H04N 5/23212 348/222.1 |
| 2010/0194967 A1* | 8/2010 | Amano | G02B 7/34 348/345 |
| 2011/0134286 A1* | 6/2011 | Inoue | H04N 5/23212 348/241 |
| 2012/0162492 A1* | 6/2012 | Akamatsu | G03B 13/36 348/345 |
| 2012/0200725 A1* | 8/2012 | Albu | H04N 5/23212 348/222.1 |
| 2013/0026349 A1* | 1/2013 | Kinugasa | H04N 5/378 250/214 SW |
| 2014/0176785 A1* | 6/2014 | Sambonsugi | H04N 5/23212 348/350 |
| 2014/0253774 A1* | 9/2014 | Ogura | H04N 5/361 348/308 |
| 2014/0307134 A1 | 10/2014 | Kanda et al. | |
| 2014/0347549 A1 | 11/2014 | Nakamoto et al. | |
| 2017/0118396 A1* | 4/2017 | Ohnishi | H04N 5/23212 |

\* cited by examiner

ADAPTIVE AUTOFOCUSING SYSTEM

CROSS-REFERENCES TO RELATED APPLICATIONS

This application claims the benefit of priority to European Patent Application No. 15169848.7, filed on May 29, 2015, the disclosure of which is hereby expressly incorporated by reference in its entirety.

FIELD OF THE INVENTION

The present invention relates to an optical autofocus system and related methods and computer programs for operating the system, in particular for use in a digital still camera.

BACKGROUND OF THE INVENTION

FIG. 1A illustrates a conventional single lens reflex (SLR) cameras involving a phase-detection autofocus (PD AF) system 5 having a dedicated sensor with a number of linear sensor pairs onto which pairs of luminous bundles from the taking lens are focused, each by its own microlens. FIG. 1B is an image of such autofocus sensor chip with a number of discrete linear sensors (horizontal and vertical black lines). Each luminous bundle focus typically covers several sensors, and each sensor pair makes up a so-called focus point, and each such point corresponds to specific position on the lens and in the frame of the image as typically shown in the image finder. Over the years, more and more advanced sensors and autofocus points have been added to standard cameras, such as cross-type and oblique serving to improve autofocus on a wide range of different structures. Also, it has been suggested to improve the accuracy by expanding the light bundles onto area sensors such as in U.S. Pat. No. 6,297,909.

Modern phase-detection AF systems suffers from a number of disadvantages.

The optical elements and sensors require high precision to get accurate results, and must be properly installed and aligned during the manufacturing process. Even slight deviations would result in the autofocus being off. Camera manufacturers have high precision calibration systems that allows for calibration of the autofocus for each individual camera during the inspection and quality assurance process. Even when precisely calibrated, the precision degrades with changes in temperature.

In low light conditions, the signal to noise ratio in the readouts from the sensors becomes small and the comparison between the phase signals becomes difficult and slow.

Cross type autofocus points provides precise autofocus on horizontal and vertical structures. But structures oriented at for example 45 degrees will be smeared out on both the vertical and the horizontal line sensor of the cross, resulting in poor precision. Some cameras have special autofocus points for oblique structures, but since each region in the frame can only be covered by one autofocus point, the specific structure to be focused on may not overlap with an autofocus point suitable for the shape and orientation of this structure.

Recently sensors with phase-detection pixels built into the sensor so that the image taking sensor can be used for both phase- and contrast-detection AF has been introduced, in particular by Canon, see e.g. WO 2010/101096. These are typically referred to as Dual Pixel CMOS AF or Hybrid CMOS AF and are used in some DSLR cameras to improve autofocus during in live view and video mode. Such DSLR cameras then also has a separate phase-detection AF module placed under the mirror which is used in other modes.

In the last appr. 6 years, the so-called compact system cameras, CSC, (or mirrorless cameras or Electronic viewfinder interchangeable lens (EVIL)) have been introduced. Since these do not have a mirror they cannot use conventional separate phase-detection AF modules. More advanced CSCs use the Dual Pixel CMOS AF or Hybrid CMOS AF systems to provide phase-detection AF.

DSLR or CSC cameras with dual pixel or hybrid AF systems do not provide a replacement of separate phase-detection AF modules in DSLR cameras, and there is still a need for improving separate phase-detection AF systems.

Hence, an improved autofocus system would be advantageous, and in particular a more precise, flexible and/or reliable autofocus system would be advantageous.

SUMMARY OF THE INVENTION

It is a further object of the present invention to provide an alternative autofocus sensor to the prior art autofocus sensors. In particular, it may be seen as an object of the present invention to provide a method and a phase-detection autofocus system that solves the above mentioned problems of the prior art with precision and flexibility.

Thus, the above described object and several other objects are intended to be obtained in a first aspect of the invention by providing, in a first aspect, a method for generating a focus measurement signal for a taking lens of a camera by a phase-detection autofocus system, the method comprising focusing at least one pair of luminous bundles from the lens onto a corresponding pair of illuminated regions on an autofocus sensor, reading out values from the illuminated regions and performing correlation analysis between values of pixels in the illuminated regions to generate a focus measurement signal, wherein the autofocus sensor is a single high-resolution, two-dimensional, image sensor separate from a taking sensor of the camera, the image sensor comprising a continuous, two-dimensional array of light sensitive pixels, each pixel having a, light-insensitive storage element associated therewith.

In a second aspect, the invention provides a phase-detection autofocus system for detecting a focus of a taking lens of a camera, the system comprising optical elements for focusing at least one pair of luminous bundles from the lens onto a corresponding pair of illuminated regions on a single high-resolution, two-dimensional image sensor separate from a taking sensor of the camera, the image sensor comprising a continuous, two-dimensional array of light sensitive pixels, each pixel having a, light-insensitive storage element associated therewith.

In the following, a number of further aspects as well as preferred and/or optional features, elements, examples and implementations will be described. Terms and concepts used in the description and claims will be described in more detail to guide the interpretation. Features or elements described in relation to one embodiment or aspect may be combined with or applied to the other embodiments or aspects where applicable and by proper adaptation within the capabilities of the skilled person. For example, structural and functional features applied in relation to the phase-detection autofocus system may also be used as features in relation to the method for generating a focus measurement signal by proper adaptation and vice versa. Also, explanations of underlying mechanisms of the invention as realized by the inventors are presented for explanatory purposes, and should not be used in ex post facto analysis for deducing the invention.

According to the invention, a single 2D image sensor with a single continuous, 2D array of pixels makes up the autofocus sensor. This means that the foci from all luminous bundles used in the phase-detection autofocus are focused on the same single sensor. This novel and inventive feature stand in strong contrast to all prior art phase-detection autofocus systems where at least two discrete sensors are used, so that the two luminous bundles of each pair can be focused on discrete sensors. The use of a single 2D image sensor in accordance with the invention provides a number of advantages in comparison with systems involving multiple line sensors or two area sensors such as:

Cost benefit in term of resolution per pixel.
Simplicity in terms of lack of synchronization of capture between the sensors.
Minimized physical size of optics and sensor providing a smaller autofocus unit.
Less power consumption.
Single data recording since only one frame need be captured and stored.
Simpler electronics due to fewer physical sensors.

The 2D image sensor is preferably a high resolution sensor, which in this context means a resolution of at least 500 pixels in the direction with the fewest pixels, such as preferably at least 800, or 1.000 pixels in the direction with the fewest pixels. The preferred resolution, i.e. the number of pixels, depends on a large number of factors which will be elaborated later. Also, the sensor is preferably a CMOS image sensor or another type of active pixel sensor.

In the correlation analysis between values of pixels in the regions, values of the selected pixels are used to generate a curve of pixel value as a function of pixel position, sometimes in prior art literature referred to as the phase signal. This curve is generated for a line in both regions and the curves are correlated to identify same shape features and determine relative positions of these. The relative positions will tell whether object is in front focus or back focus position. The correlation process may be similar to the comparison of signals from pairs of linear sensors on prior art autofocus sensors.

In the present description, "pixels" designates the light sensitive elements of the image sensor. However, often subsets of two or more pixels will be combined or merged and the values added and normalized, so that the subset is treated as a single pixel. Hence, when referring to pixels throughout the description, a single pixel or a subset of combined pixels might be meant. Thus, in all embodiments where different sets of pixels are selected for correlation analysis, it may be preferred that each pixel is a subset of pixels comprising two or more abutting pixels whose values are combined for use in the correlation analysis. Also, the pixels of such a pixel subset may lie along a given direction, with different sets having the pixels in its subsets lying along different directions. Further, it is preferred that pixel subsets lie, or are "stacked" in a direction parallel to a direction between the illuminated regions. These configurations are exemplified later in relation to FIGS. 7 and 8.

When using a single 2D image sensor as autofocus sensor, phase signals from different regions on the same image sensor are correlated. The sequential read-out of the pixels values may cause the two phase signals to be recorded at different times. If the object to be in focus moves, this time-difference could lead to the phase signal not representing the same scene and the focus measurement signal being imprecise. Therefore, the light-insensitive storage element associated with each pixel can store each pixel value locally so that all pixel values can be stored simultaneously without the need for reading values out immediately.

The light-insensitive storage elements associated with the pixels can for example involve floating diffusion and transistors associated with each pixel, providing charge storage into which the accumulated charge (i.e. the pixel value) from the photodiode in each pixel can be transferred and stored. This allows the entire frame to be captured at the same instant and read out sequentially thereafter.

These storage elements are preferably on-chip, meaning that they are integrated on the chip holding the photodiodes and internal electronics of the image sensor (typically a CMOS).

The focus measurement signal is a signal resulting from the correlation of selected pixels from the two regions, in particular from the relative positions of the identified shapes or patterns. The focus measurement signal will contain information as to whether the object is in focus, front focus, or back focus position. The focus measurement signal can for example be used to control a lens motor and to present information to the focus state in the viewfinder.

Light from the taking lens is guided to the autofocus sensor via a number of mirrors and lenses including separator lenses and masks. Since the masks are positioned in the out-of-focus light field they blend out light from the lens so that only lights from certain parts passes to create luminous bundles which are focused on the autofocus sensor to form the illuminated regions. In other words, the illuminated regions are the regions on the 2D image sensor that lie within the foci of the luminous bundles. In a preferred embodiment, the illuminated regions are positioned in a pattern that is a closest packing for the shape or shapes of the regions, or, if the regions have different shapes and/or sizes, that they are positioned in an optimal packing. Alternatively, it is preferred that the sizes of regions of a given shape are adjusted to make a closest packing cover a maximum number of pixels of the sensor. For example, it may be preferred that the illuminated regions are circular and positioned in a hexagonal packing (closest packing) or a square packing (optimal packing) depending on the dimensions of the sensor or the regions. In another example, it may be preferred that the regions are hexagonal and packed in a honeycomb pattern. In yet another example, it may be preferred that the regions are rectangular with a size and aspect ratio so that they can cover almost the entire sensor.

In prior art autofocus sensors, there will typically be only one linear sensor within each focus, a typical prior art linear sensor being around 50 pixels long. In the present invention, the entire focus will be filled by the continuous 2D pixel array of the image sensor, the size of this illuminated region is preferably of the order of 400×400 pixels.

In the second aspect, the phase-detection autofocus system preferably further comprises a CMOS readout circuit configured to determine the values from the illuminated pixel regions from the sensor and an evaluation unit performing correlation analysis between values of pixels in the illuminated regions to generate a focus measurement signal.

The CMOS readout circuit preferably comprises row and line decoders and multiplexors as is standard in modern CMOS image sensors, and may read out all pixels of the image sensor, or may, if the sensor type allows, address and read out only selected pixels only, such as pixels in the illuminated regions.

The evaluation unit may be implemented as software or hardware or a combination of such. A software implementation may be as applications stored in a memory and executed by a CPU in the camera. Software implementation has the advantage that it can easily be updated to fix bugs or to comply with new system requirements, as well as adding new functionalities. A hardware implementation may be algorithms encoded in an integrated circuit such as an ASIC or a FPGA. Hardware implementation has the advantage that it can the analysis can be made very fast, so that the user to not experience unnecessary delays with the autofocus system.

In prior art autofocus systems, there will be one or more fixed, discrete, typically one-dimensional sensors lying within each focus of a luminous bundle from the taking lens. Light can only be picked up at the positions of the pixels of these discrete sensors.

In the present invention, the autofocus sensor has a continuous 2D array of pixels, meaning that the foci of all luminous bundles on the sensor (i.e. all illuminated regions) are completely covered by pixels. This provides the advantage that, in a preferred embodiment, the pixels used in the correlation analysis are dynamically and/or adaptively selected from the illuminated regions. Similarly, the evaluation unit of the autofocus system may dynamically and/or adaptively select pixels from the illuminated regions to be used in the correlation analysis.

In this respect, "dynamically" means performed "on the fly" or based on decisions made while the process (of finding a focus) is running rather than beforehand. Also in this respect, "adaptively" means to make suitable for a particular purpose or new requirements or conditions, by means of modifications or changes. For example, calibrating the autofocus system by selecting which pixels to be used as default after assembly or events that brought it out of calibration would be an adaptive selection of pixels.

In prior art autofocus systems, if a microlens creating a focus is not precisely aligned at fabrication, or later misaligned due to shocks or large temperature variations, the discrete sensor(s) will not lie optimally within the focus, possibly even partly or completely outside the focus. This will cause the autofocus to perform poorly or not at all.

In the present invention, since regions of the sensor outside the illuminated regions are also completely covered by pixels, misalignment of the microlenses can be compensated by an adaptive selection of the pixels to be used. Thus, in a further preferred embodiment, the correlation analysis further comprises a calibration comprising the steps of: placing a target in a field of view of the phase-detection autofocus system, bringing the target into focus by means different from the phase-detection autofocus system, determining a displacement between depictions of the target in the illuminated regions.

As will be described in more detail later, it is preferred that a component of the determined displacement in a direction orthogonal to a direction between the illuminated regions is determined, and that sets of pixels to be used in the correlation analysis are selected to have a displacement equal to this component in this orthogonal direction.

This is advantageous since calibration can be performed automatically, without any mechanical adjustment of the camera. A further advantage is that calibration can be performed at any time after fabrication by the camera itself.

Using the 2D image sensor instead of fixed, discrete linear sensors gives a large freedom to dynamically optimize the autofocus system by being able to dynamically select the best pairs and shapes of autofocus collection zones. An autofocus collection zone is the set of pixels or pixel subsets used in the correlation analysis. The terms "collection zone" and "set of pixels" are used interchangeably. The pixels can be selected from the entire image sensor in any given direction, e.g. horizontal, vertical, oblique, possibly a curved line, and even an area, and are thus not fixed but can be assigned according to the situation or need and the positions of the illuminated regions in which they lie.

In another preferred embodiment, the selection of pixels comprises selecting a first set of pixels and performing the correlation analysis, and, if the correlation is poor, selecting a second set of pixels and performing the correlation analysis. This might be repeated until a set of pixels with a satisfactory correlation result has been found.

A poor correlation is a correlation where the best match between the curves (pixels values as a function of position) does not give rise to a prominent maximum. Such poor correlation may be a result of different scenarios. If the values of pixels does not contain any significant structure or variation that can be used to determine a displacement between the curves, the resulting correlation will be poor or indefinite. This lack of structure or variation may be a result of the object having no significant structure or variation or not having such in a direction normal to the direction between the luminous bundles.

Since the autofocus system does not know the structure of the object, it can obtain correlations from several pairs of autofocus collection zones from the regions, and compare the correlation results to arrive at the best decision. One option would be to assign weights to several pairs of zones (e.g. adjacent lines or lines different inclinations) that are then all used to generate the focus measurement signal. Therefore, in an alternative embodiment, the selection of pixels comprises, performing a correlation analysis between values of different sets of pixels in the regions, scoring the correlations and selecting one or more sets of pixels to be used in generating the focus measurement signal.

In this way, multiple autofocus collection zones can be evaluated and used. An autofocus collection zones can be orientated in for instance 45 degree for better focus detections of inclined structures in the scene, and cross pattern autofocus collection zones can be established for +45 and −45 degree as well as a either horizontal or vertical zones simultaneously.

The dynamic selection of pixels provides another novel functionality, in that the method preferably further comprises increasing an effective pixel size by combining adjacent pixels within each illuminated region to accommodate for light conditions and performing the correlation analysis between values of the combined pixels in the regions. This dynamic change of autofocus pixel size is advantageous since, depending on the light conditions, pixels from the high resolution 2D sensor can be merged to obtain better signal to noise ratios giving more robust autofocusing in low light situations.

The use of the 2D image sensor as autofocus sensor also provides entirely new approaches to phase-detection autofocusing. In a further embodiment, the correlation is a two-dimensional correlation to determine an image pattern present in both illuminated regions and a displacement between their positions within their respective regions.

In this case, the autofocus collection zone is two-dimensional, i.e. an area of pixels, and the phase-detection uses signal correlation in two dimensions rather than the classical AF phase-detection on one-dimensional signals. Using 2D collection zones provides a number of advantages over linear collection zones. Any linear autofocus sees a snippet of whatever feature lies in the relevant autofocus point sensor. If the snippet is oriented in a direction with little variation, the correlation will generally be poor. A 2D collection zone is advantageous since the structures to be in focus may not have any directional features allowing for a good correlation with a linear collection zone, regardless of its orientation. In 2D correlation, all directions are considered simultaneously in that it is a correlation between two small images sections. This leads to a more robust AF system with higher precision.

The 2D collection zone may have different sizes and shapes. However, the smaller aspect ratio (longer side/ shorter side) the collection zone has, the larger chance that any structure in the object will be represented in a way allowing for a useful correlation. Hence, the 2D collection zones preferably have aspect ratios smaller than 10, such as preferably smaller than 5, 4, or 3. In a preferred embodiment, the 2D collection zones have aspect rations smaller than 2.

BRIEF DESCRIPTION OF THE FIGURES

The method and system according to the invention will now be described in more detail with regard to the accompanying figures. The figures show one way of implementing the present invention and are not to be construed as being limiting to other possible embodiments falling within the scope of the attached claim set. The figures are for illustration purposes and are not to scale.

DETAILED DESCRIPTION OF AN EMBODIMENT

Figure 1A:
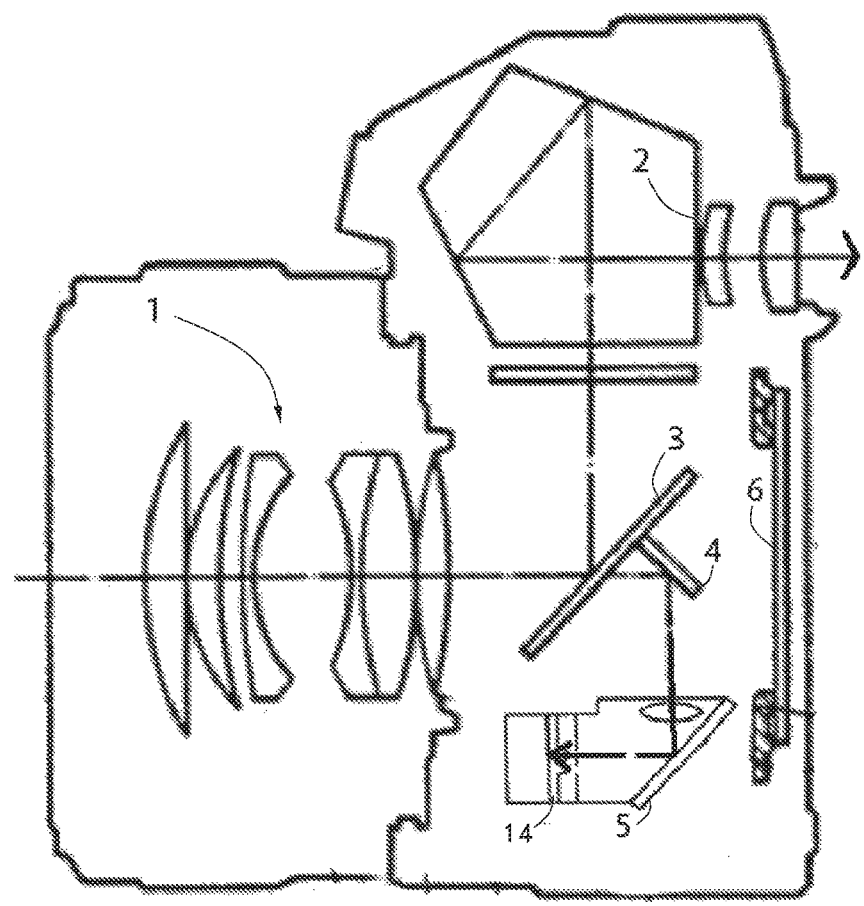
FIG. 1A shows an autofocus system for a DSLR camera as used in the prior art, and also illustrates an embodiment where the autofocus system according to the invention is used in a DSLR camera.
Figure 1B:
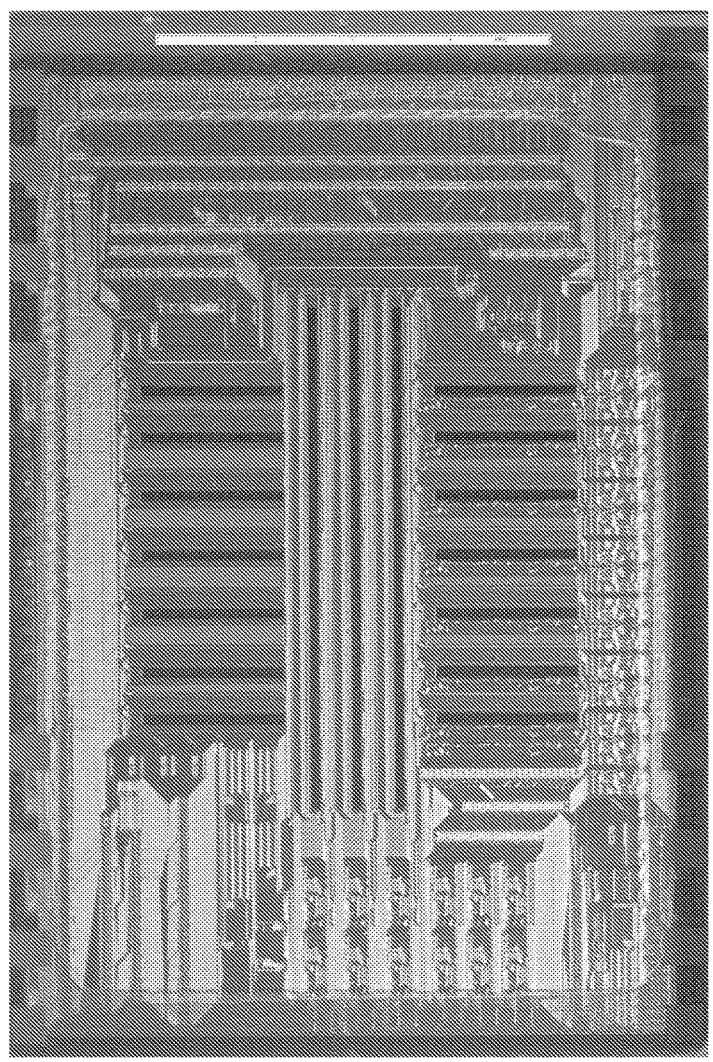
FIG. 1B is an image of a typical autofocus sensor chip of a prior art DSLR camera.

A conventional phase-detection autofocus system in a single lens reflex (SLR) camera as shown in FIG. 1A uses an autofocus detection unit 5 placed behind the focal plane of the taking lens 1. The main mirror 3 directs an image of the object to the prism 2 of the optical viewfinder and also has semitransparent zones to allow the autofocus luminous bundle's to pass through to the autofocus mirror 4, which directs the bundles to the autofocus detection unit 5. Behind the autofocus mirror is the camera image sensor 6.

Figure 2:
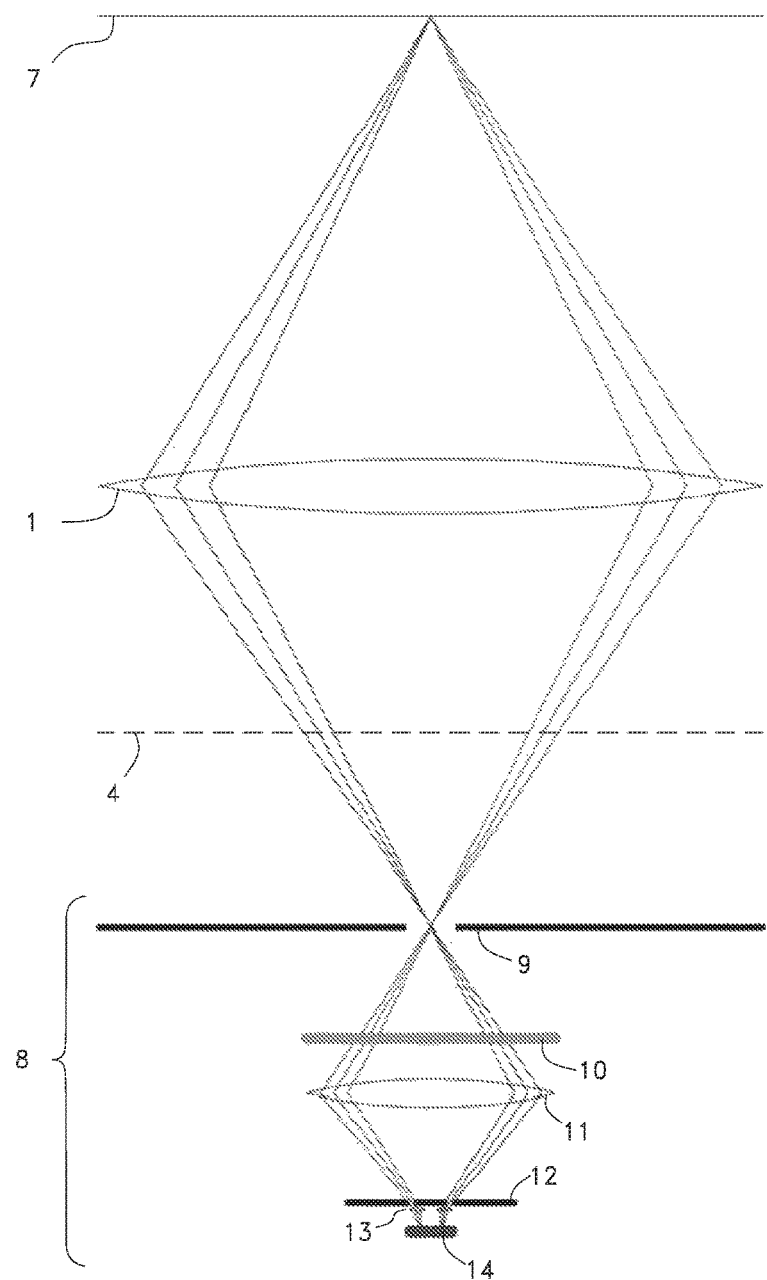
FIG. 2 illustrates the light paths and optical components of an embodiment of the autofocus system of the invention.

FIG. 2 illustrates the light paths and optical components from an object plane 7 to an embodiment of the autofocus system 8 of the invention. In this embodiment, the autofocus detection system 8 contains an AF field stop mask 9, an IR filter 10 and a relay lens 11, before the luminous bundles are separated by an AF aperture plate 12 positioned in an out-of-focus plane. Each luminous bundle is focused on an autofocus sensor 14 by a microlens 13. The objective of the optical components and layout here is to generate and focus pairs of luminous bundles originating from opposite sides of the taking lens. The autofocus system 8 can be used in a DSLR camera as shown in FIG. 1A, where it replaces the autofocus detection unit 5. Except from the autofocus sensor 14, the components and layout can be similar to those of such prior art autofocus systems. As can be seen, the autofocus sensor 14 is separate from the taking sensor 6. Different layouts using different components to generate foci of such luminous bundles may be contemplated and could be used in the present invention.

Figure 3:
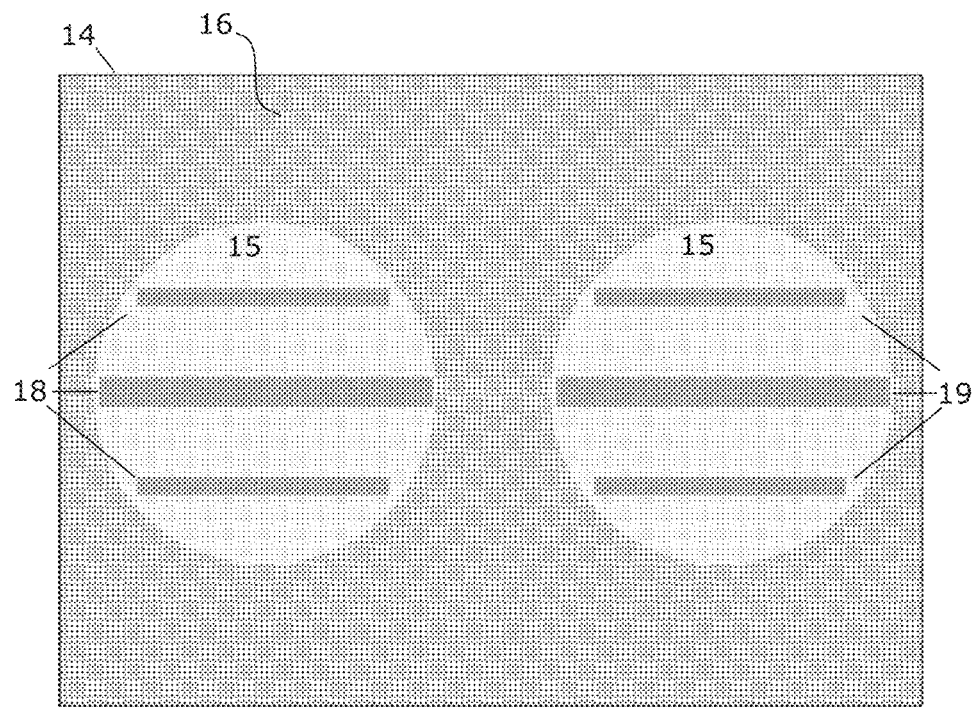
FIGS. 3 and 4 illustrate a two-dimensional image sensor having a two-dimensional array of light sensitive pixels and two and eight illuminated regions, respectively.

The foci on the autofocus sensor 14 formed by the microlenses 13 are the luminous regions 15 illustrated in FIG. 3, where the front of the autofocus sensor can be seem. The autofocus sensor 14 is a high resolution 2D image sensor with a continuous 2D array 16 of light sensitive pixels. The preferred resolution is a balance between a number of factors such as:

- the sampling rate of the phase signal required to obtain a good correlation analysis (larger resolution means more samples and thus more detail in the phase signal);
- the time required to read out the pixels in the illuminated regions or of the entire sensors (larger resolution means more pixel values and more time for read-out and storage);
- size of image sensor, there is limited space inside a camera housing (higher resolution often means a larger sensor);
- price of image sensor (higher resolution often means more expensive).

Future developments might change the weighing of these factors, but at present, an image sensor with a resolution of the order 1.000×1.000 pixels (1 Mpixel sensor). As an example, the image sensor might be an IBIS5-1300, a 1.3 Megapixel (1280×1024) CMOS active pixel sensor from ON Semiconductor. This sensor has the desired on-chip, light-insensitive storage element associated with each pixel, allowing for instantaneous capture of an entire frame of the 2D sensor.

In the simplest implementation of the invention, the autofocus system can be designed as illustrated FIGS. 2 and 3 with only two illuminated regions 15 on the sensor 14 corresponding to the two horizontal displaced focus luminous bundles in the lens 1 of FIG. 2. With only horizontal displaced luminous bundles from the lens, the illuminated regions will be horizontal displaced as well and the system will mainly be able to focus on vertical patterns or structures in the scene to be photographed. When using single one-dimensional correlation analysis, collection zones 18 and 19 in the regions should be oriented parallel to the direction between the regions in which the zones lie. As will be described later, however, it will still be possible to design collection zones in different directions with the same orientation. As for prior art autofocus systems, each collection zone pair correspond to a focus point in the viewfinder. But whereas the sensors, and thus the focus points are static in the prior art systems, this is not the case in the present invention. Collection zones 18 and 19 in FIG. 2 are examples of 2 three zone pairs corresponding to three focus points. But since the collection zones can be selected dynamically, the focus points can as well, and as many focus points as desired can be made, with the resolution of the sensor setting the limit.

Figure 4:
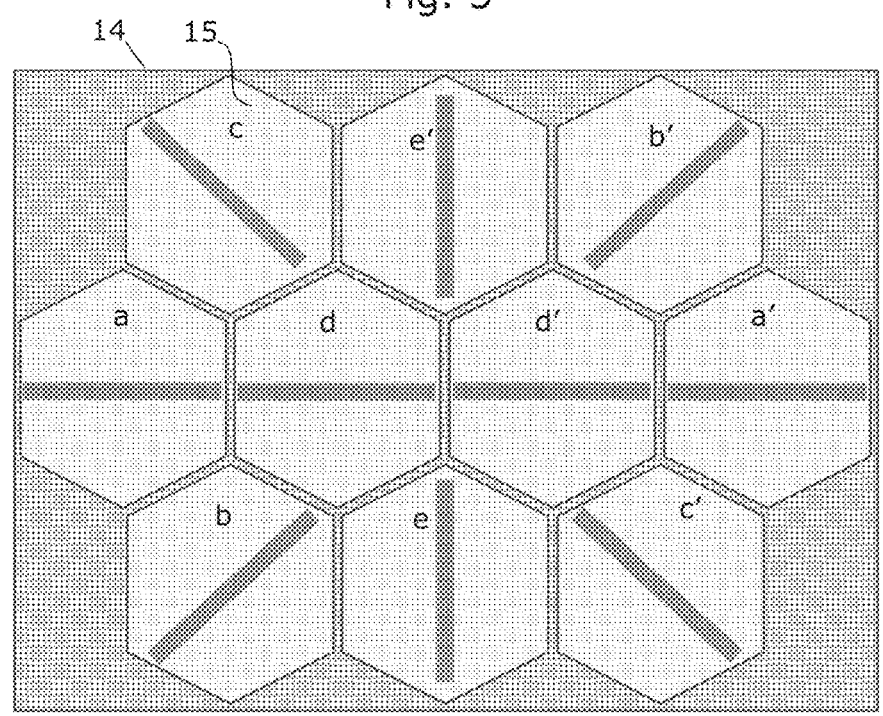

The embodiment illustrated in FIG. 4 has 10 illuminated regions 15, or five pairs a/a', b/b', c/c', d/d', e/e'. Here, the optical setup and components of the autofocus system involves five pairs of microlenses 13 and a corresponding AF aperture plate 12. In this embodiment, the illuminated regions are hexagonal and packed in a honeycomb closest packing. As compared to circular regions, more pixels of the image sensor are used, reducing the need for per-pixel-efficiency of the sensor.

This is an exemplary configuration with many rather small illuminated regions instead of fewer larger. Since, as mentioned above, the linear collection zones should be oriented parallel to the direction between the region pairs, this configuration gives rise to vertical, horizontal and +/−45° focus points distributed over the field of view. As mentioned above, as many additional collection zones as desired can be selected in every region pair. This freedom in selecting which pixels to use as a collection zone gives rise to an equivalent freedom for the focus points presented to the user. Hence, in a preferred embodiment, focus points can changed dynamically and be created, moved and scaled according to the conditions and the scene.

According to the invention, values of the selected pixels in each region are used to generate a pair of curves of pixel value as a function of pixel position (phase signals). These curves are correlated to identify same shape features and determine relative positions of these. As an example, consider two such curves f and g differing only by an unknown shift along their position (x) axis. One can use cross-correlation, (f*g), to find how much g must be shifted along the x-axis to make it identical to f. The cross correlation formula essentially slides the g function along the x-axis, calculating the integral of their product at each position. When the functions match, the value of (f*g) is maximized. If the curves lack any prominent feature, this maximum may not be very prominent in comparison to other maxima at other shifts. This is referred to as a poor correlation. Cross correlation analyses can be made to yield the initial shift of the curves (i.e. the displacement on the sensor), a measure of how similar the curves are at their best match, and how large the maximum at best match is in comparison to other maxima at other shifts.

Figure 5:
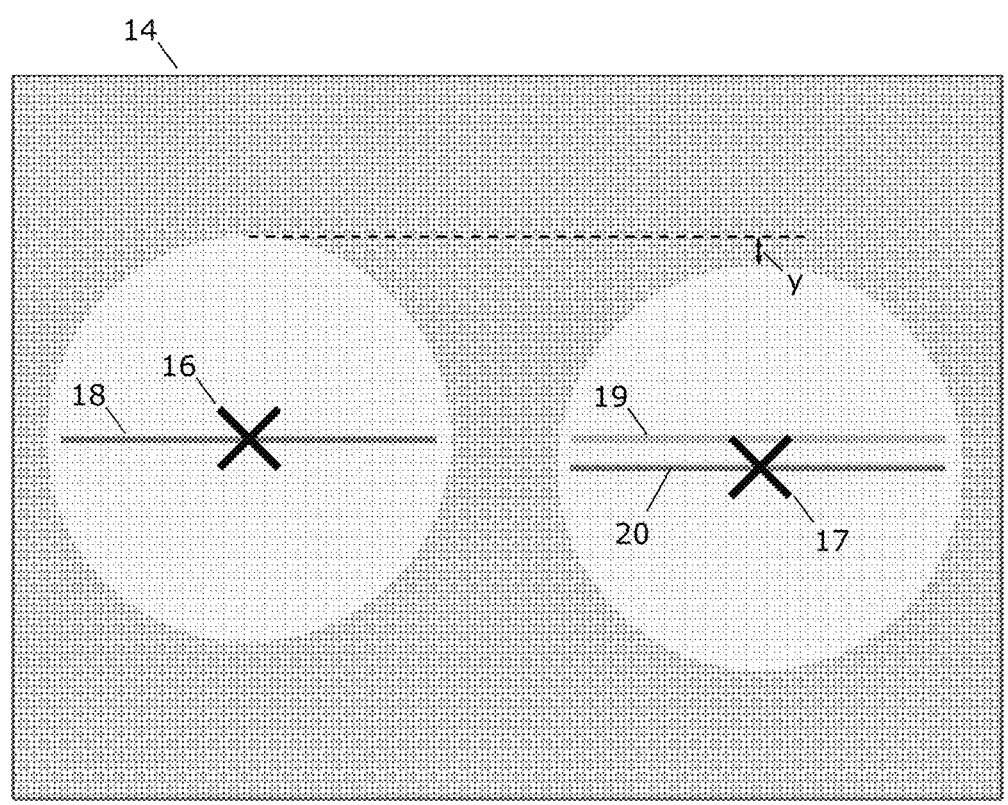
FIG. 5 illustrates an embodiment for calibrating the autofocus system by adaptive selection of collection zones in each illuminated regions.

In the following, a calibration utilizing adaptive selection of pixels to be used in the correlation analysis will be described in relation to FIGS. 5 and 6. Only with a 100% perfect optical system, i.e. perfect optical components and perfect alignment of these, will the location of the two horizontal illuminated regions be perfectly horizontal. In real life this is most often not the case. With the present invention using a 2D image sensor instead of the traditional fixed positioned linear sensors, it is possible to select two autofocus collection zones which are perfectly matching each other even with the given tolerances and alignments of the optical components.

A calibration target can be held in the centre of the field of view of the camera, preferably on a flat, white background, and brought into focus either by exact knowledge of its distance and the focus state of the camera lens or by a secondary focus system such as contrast focus by the taking sensor. The images on the autofocus sensor 14 are shown in FIG. 5, where the calibration target (here an X) is depicted in both illuminated regions as 16 and 17 respectively. Due to non-perfect components and alignment, the illuminated regions and thus the X's are displaced. The displacement could be in either or both of the directions parallel to the direction between the regions, here horizontal, x, and orthogonal to thereto, here vertical, y. Here, only the displacement orthogonal to the direction between the regions is discussed and is also the situation illustrated in FIG. 5 where the displacement is y.

The default corresponding collections zones in the illuminated regions would be lines 18 and 19, respectively. Due to the misalignment, line 19 does not overlap with the centre of the calibration target 17, and a correlation analysis between the curves would give a poor correlation and an imprecise focus adjustment signal.

In one embodiment, the following steps can be carried out to calibrate the autofocus system:
1. Adjust the position of the target so its depiction 16 in the primary region lies in the centre of the left illuminated region, and set the line of pixels 18 intersecting this centre as the default collection zone for the left region.
2. Determine the position of the target depiction 17 in the right illuminated regions and record the offset (y) from the line 18.

This offset or displacement is the value required for the calibration and will be referred to as the calibration displacement, and are typically split into a component parallel to a direction between the regions and a component orthogonal to the direction between the regions. The calibration displacement can be used to set default collection zones as sets of pixels, which are displaced orthogonally to the direction between the regions by the orthogonal component of the displacement. Also, when dynamically assigning collection zones, sets of pixels from the regions used in correlation analysis should be orthogonally displaced by this component. In the situation illustrated in FIG. 5, this would mean setting line of pixels 20, displaced y from line 18, as the default collection zone for the right region.

The calibration displacement parallel to the direction between the regions is also needed. But, since the collection sets in the one-dimensional case, are directed in this direction and often extend through most, or the entirety of, the illuminated regions, it does not affect the selectin of pixels used but is simply a constant added to the correlation result when generating the phase measurement signal.

Figure 6:
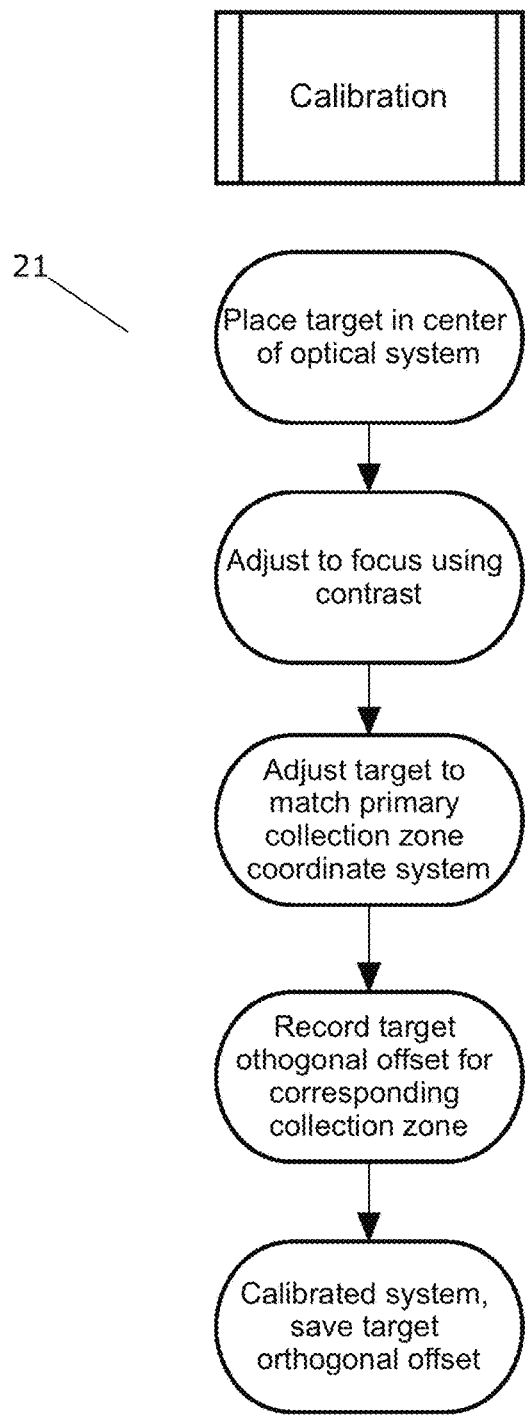
FIG. 6 is a schematic system-chart representing an outline of the operations of the evaluation unit according to the calibration illustrated in FIG. 5.

These steps are also illustrated in the schematic system-chart 21 of FIG. 6. This chart represents an outline of the operations of the evaluation unit according to this embodiment.

In an alternative embodiment, the calibration can be carried out by:
1. Identifying positions of both the illuminated regions on the sensor by identifying the intensity profiles of the foci. Typically, only approximate positions can be determined
2. Performing a correlation analysis between several different sets of pixels within the illuminated regions. In FIG. 5 this would mean selecting several horizontal lines of pixels in both left and right regions and carry out correlation analysis between all left-right pairs.
3. Identifying a pair of sets with the best correlation. Here, pair 18-20 would have a much better correlation than pair 18-19. Line 19 would have a just as good correlation with a line four rows higher in the left region. The target depictions might lie away from the centre of both regions.
4. Determining a calibration displacement between the identified pair, here y.

As before, the calibration displacement can be used for selecting a pair of collection zones lying at or close to the centres of the regions (determined in step 1) while having the orthogonal component of the calibration displacement, here y (determined in step 4) as the default to be used when generating the focus measurement signal. Alternatively, the orthogonal component can be used whenever selection collection zones, so that zones in the regions are displaced accordingly.

If the positions and shape of the regions can be determined with a high precision, in step 1, this would suffice to determine their centres (vertical and horizontal) and their relative displacements, and the default pair of collection zones could be selected intersecting these centres directly. However, the focus profiles are typically not sufficiently defined to determine the displacement as precise as with correlation analysis using a calibration target.

Whereas this procedure involves much more computation—reading entire image to determine region positions and carrying out and scoring many correlation analyses—it allows for a fully automated autofocus calibration procedure that can be carried out anytime by anyone. The user would simply place a standard target in front of the camera and initiate the calibration. With more advanced algorithms, this calibration can be carried out without a standardized calibration target, but any object having significant features that would lead to a precise correlation. For example, the instruction could be to draw a black X of about 20×20 cm on a white background and place it about one meter in front of the camera.

In an alternative to the above, fully automated calibration procedure, the calibration displacement may be determined by determining the positions of the calibration target in both regions by other kinds of analysis (1D or 2D) than correlation analysis.

In the above embodiments, the calibration of a simple case—only one focus point and only vertical displacement—has been described. It is considered within the capabilities of the person skilled in the art to extend this to other situations.

In the traditional autofocus sensor design with fixed, discrete linear sensors, rather big pixels were used in order to provide good coverage of the illuminated region and thus use as much as the light as possible. In the present invention using a high-resolution 2D image sensor, the illuminated region is covered multiple columns and rows of small pixels. This renders a number of new functionalities possible where the extraction of the autofocus phase signal can be dynamically optimized for various scene and lightning conditions.

As described previously, using horizontal displaced luminous bundles in the lens mainly allows focusing on vertical patterns or structures in the scene, and vice versa for vertically displaced bundles. Sometimes, however, there are no significant vertical or horizontal structures within the focus point, but there might be significant oblique structures. An embodiment of the invention provides an autofocus procedure utilizing dynamic selection of pixels that will find and utilise to most prominent structures in the focus point regardless of their direction. This will be described in relation to FIGS. 7 and 8 using horizontal displaced luminous bundles, and FIG. 9 which is a schematic system-chart illustrating the steps and representing an outline of the operations of the evaluation unit according to this embodiment.

Figure 7:
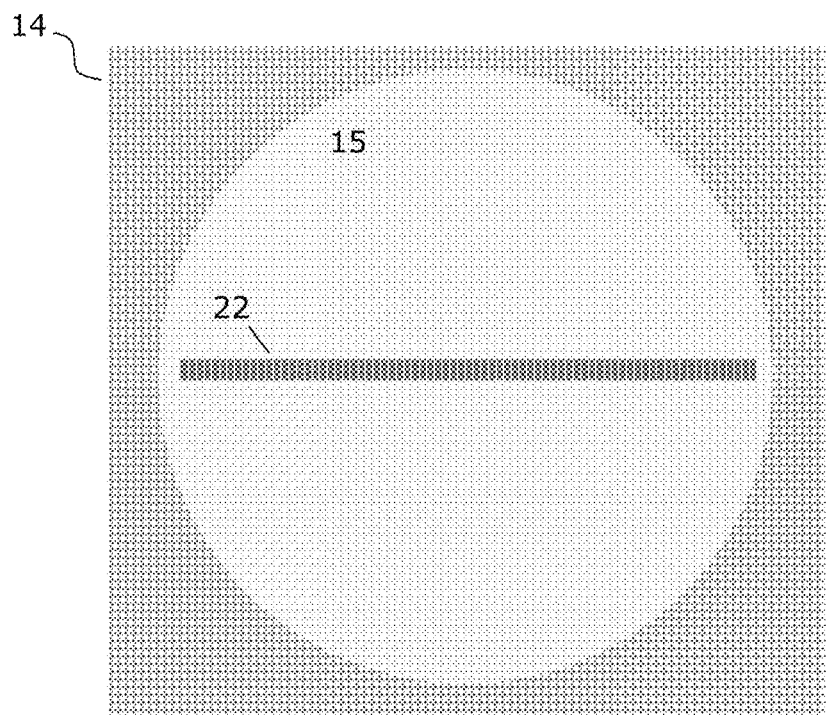
FIGS. 7 and 8 illustrate a section of the image sensor with an illuminated region and different sets of pixels to be used in an embodiment for dynamic selection of collection zones.
Figure 8:
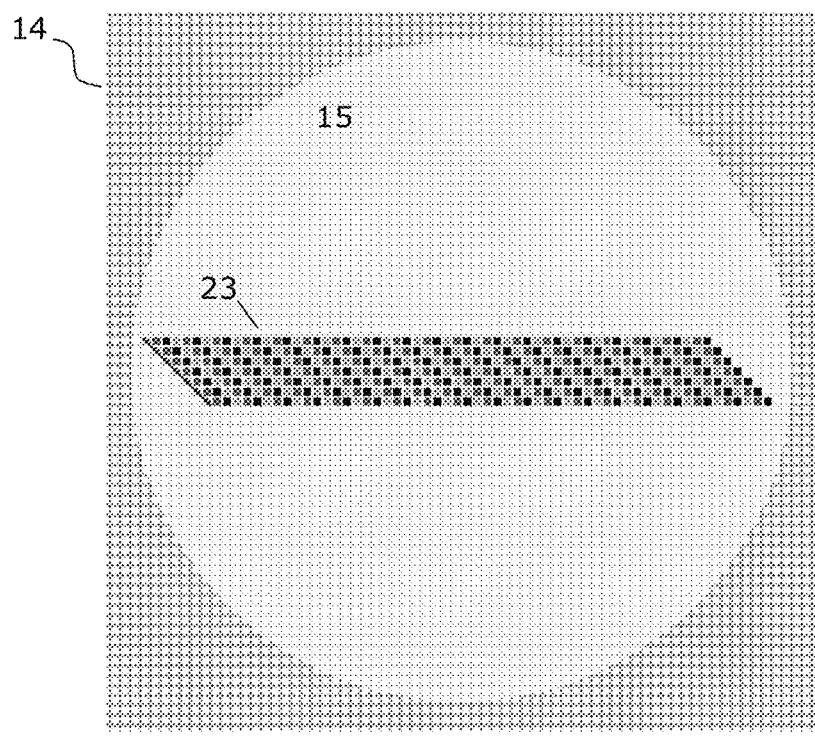
Figure 9:
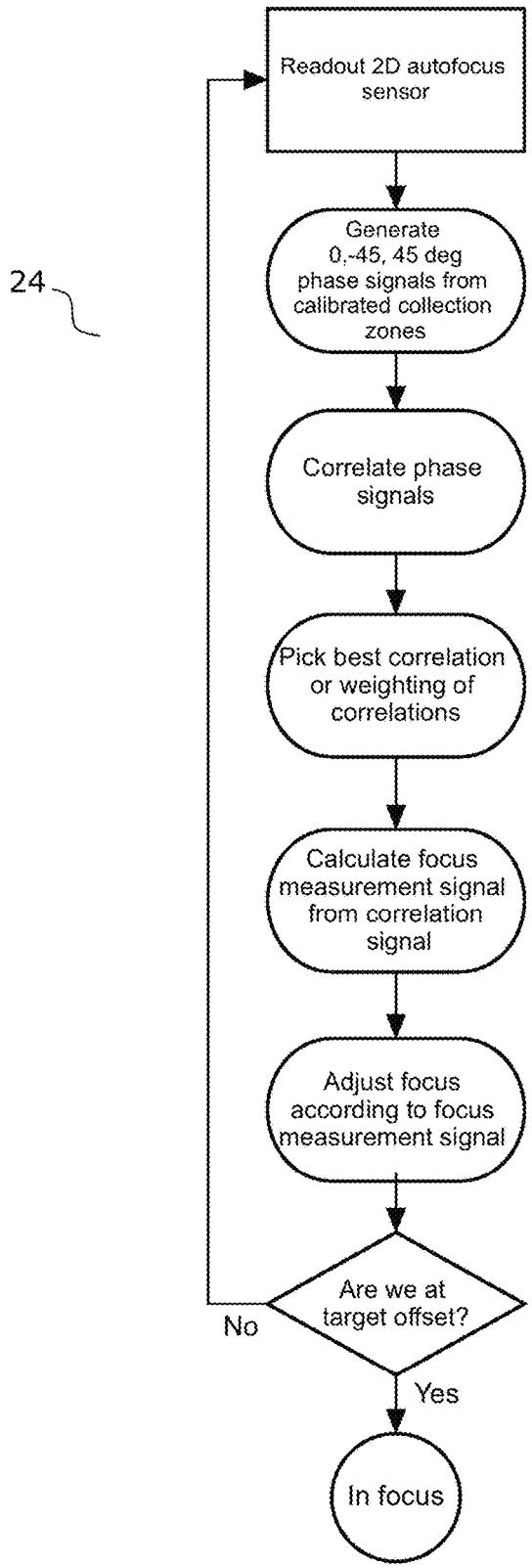
FIG. 9 is a schematic system-chart representing an outline of the operations of the evaluation unit according to the embodiment for dynamic selection of collection zones illustrated in FIGS. 7 and 8.

The image sensor, or at least the pixels in the illuminated regions are read out and phase signals are generated from different sets of pixels along different directions. FIG. 7 illustrates a horizontal line 22 of pixels, each pixel being a subset of three vertically stacked pixels that are combined to collect enough light. In the longitudinal direction the small pixels provide a high resolution, but in order to have a large signal to nose ration pixels are typically merged in the lateral direction, which does not affect the sampling rate of the phase signal. FIG. 8 illustrates a line 23 of pixels directed in an oblique direction of +45°. Since the bundles from the lens are horizontally displaced, the pixels of the line 23 consist of sets of seven pixels oriented along a −45° direction whose values are merged, corresponding to lateral sections of a +45° oriented line "stacked" in the horizontal direction. Hence, this collection zone "looks" in the direction of +45°, but is still oriented parallel to the direction between the horizontally displaced regions. The phase signals from the sets along different directions are correlated and the pair with the strongest correlation is selected. Having performed the correlation for the selected pair, a focus measurement signal is generated and the lens is moved accordingly. The procedure is iterated until focus is achieved in that there is no displacement between the signals from the selected pair.

In an alternative embodiment, the correlation analysis is performed between values of sets along different directions, the resulting correlations are scored, and one or more sets are selected to be used in generating the focus measurement signal. If more than one set is selected, they might be weighed differently, for example according to the score of their correlations.

In another alternative embodiment, the correlation analysis is first performed between values of a pair of sets along a first direction. If the maximum of the correlation at the best match is not prominent (according to predetermined requirements), then the correlation is poor and another pair of sets along a second direction is selected and correlation analysis is performed. This is repeated along a given number of directions or until a pair with an adequate correlation is found.

With plenty of light or in conditions where a little longer focus time is OK, the high-resolution pixels from the 2D image sensor can give a more precise autofocus phase signal than prior art sensors with large pixels, leading to a higher focus precision. In conditions with less light, pixels can be combined to generate larger, digitally generated pixels which collects more light thus giving a more noise free phase signal leading to more robust autofocusing. Such effectively larger and thus more light sensitive pixels can also be used if the autofocus speed needs to be faster, requiring shorter exposing time of the autofocus sensor.

Figure 10:
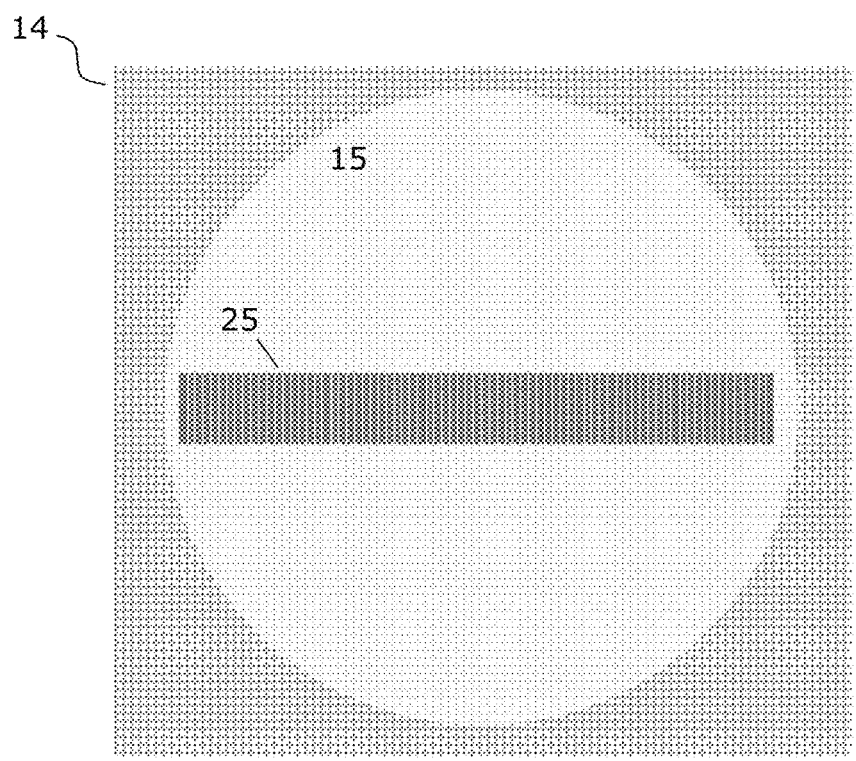
FIGS. 10 and 11 illustrate a section of the image sensor with an illuminated region and different sets of pixels to be used in an embodiment for dynamic selection of effective pixel size.
Figure 11:
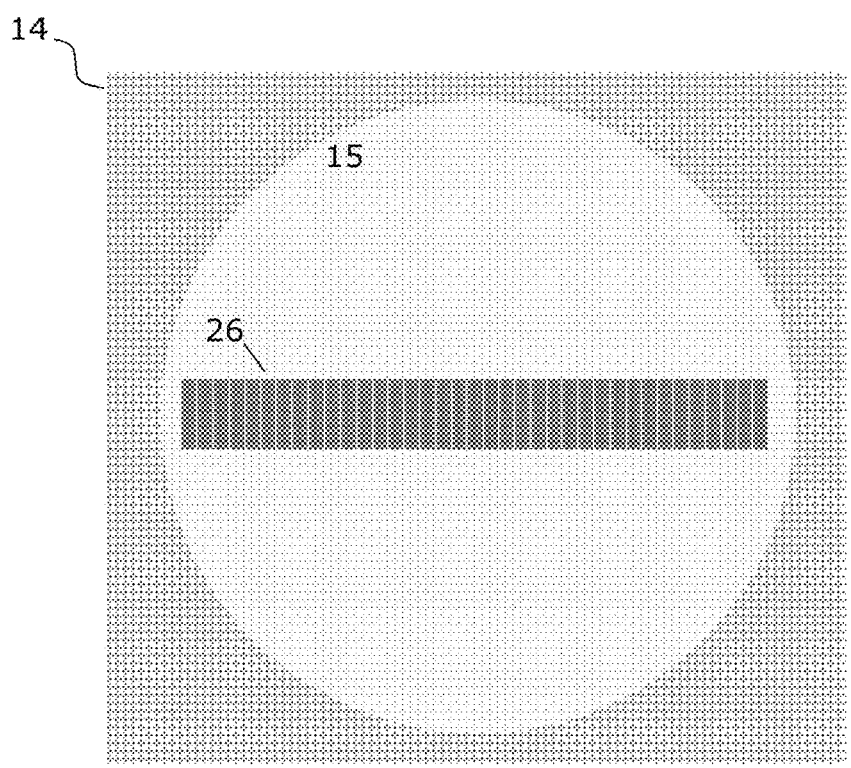

In the following, an autofocus procedure utilizing dynamic selection of effective pixel size will be described in relation to FIGS. 10 and 11. Here, an effective pixel size can be increased by combining adjacent pixels within each illuminated region and performing the correlation analysis between values of the combined pixels.

If the autofocus sensor pixels are combined transverse to the extent of the autofocus collecting zone, then the phase signal can still maintain the high resolution in the longitudinal direction, keeping the full precision of the autofocus system. This is illustrated in FIG. 10 where pixels are combined with pixels in the rows above and below to generate a line of pixels 25 with nine times larger effective pixel size. If even more light sensitivity is required, then pixels can also be combined in the longitudinal direction, which will keep the robustness of the autofocus but will lack the highest precision. This is illustrated in FIG. 11 where pixels are further combined to make a line 26 of 2×9 pixel blocks to generate an eighteen times larger effective pixel size.

Figure 12:
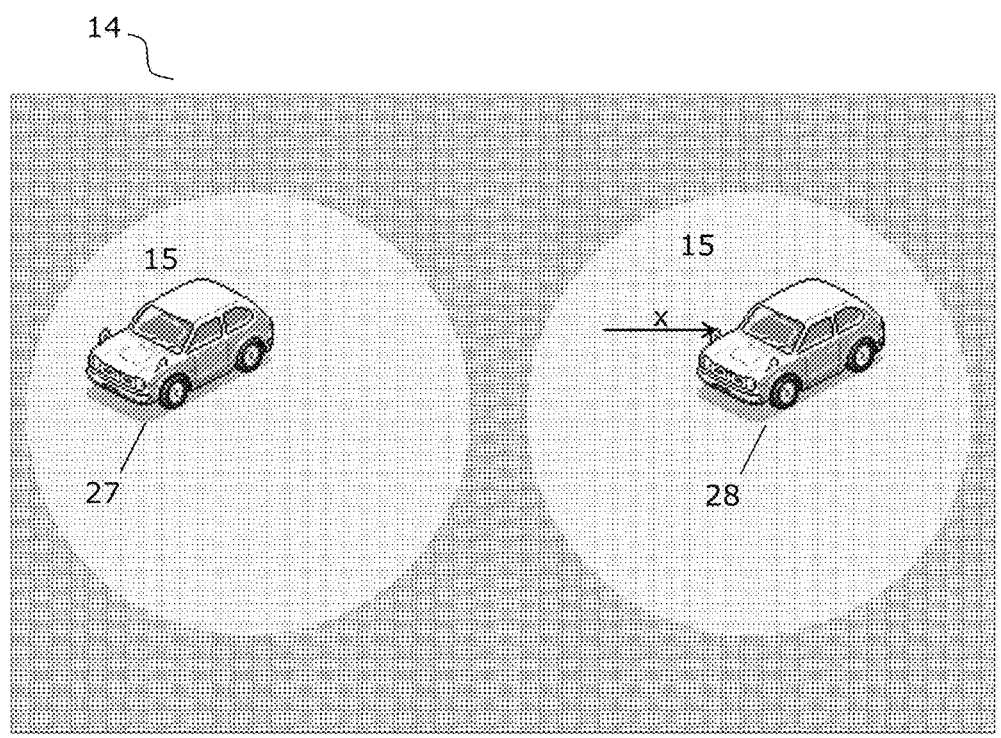
FIG. 12 illustrates an embodiment for two-dimensional correlation analysis between the illuminated regions.

The use of the 2D image sensor as autofocus sensor also provides entirely new approaches to phase-detection autofocusing that overcomes many of the limitations of systems based on linear sensors. In the following, an autofocus procedure utilizing 2D correlation analysis will be described in relation to FIG. 12.

The illuminated regions are images 27 and 28, i.e. two-dimensional signals of pixels values as a function of position in two directions. The focus measurement signal can be calculated by determining the displacement, x, of these 2D signals in pair of illuminated regions. A 2D cross correlation between the 2D signals can be used to determine the horizontal displacement x between the two 2D signals, which can be used to generate the focus measurement signal. As for 1D cross correlation, the maximum value of a 2D cross correlation indicates the location of the best match of the two 2D signals.

Since the 2D cross correlation need only be performed in the direction between the regions, a simplified, one-variable version of a general 2D cross-correlation can be used, which essentially corresponds to a series of sequential one-dimensional cross-correlations. Such 2D correlation analysis on a 2D phase signal can provide a more stable autofocus.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units inside a camera.

Although the present invention has been described in connection with the specified embodiments, it should not be construed as being in any way limited to the presented examples. Individual features mentioned in different claims, may possibly be advantageously combined, and the mentioning of these features in different claims does not exclude that a combination of features is not possible and advantageous.

The invention claimed is:

1. A method for generating a focus measurement signal for a taking lens of a camera, in a phase-detection autofocus system, the method comprising:
   focusing at least one pair of luminous bundles from the lens onto a corresponding pair of illuminated regions on an autofocus sensor, wherein the autofocus sensor is a single high-resolution, two-dimensional, CMOS image sensor separate from a taking sensor of the camera, the CMOS image sensor comprising a single continuous, two-dimensional array of light sensitive pixels, each pixel being associated with an on-chip, light-insensitive storage element;
   determining values from the illuminated regions;
   performing a correlation analysis between values of pixels in at least two pairs of the illuminated regions to generate a focus measurement signal, wherein a result of the correlation analysis yields a correlation result for each pair of the at least two pairs of illuminated regions; and
   comparing the correlation results from the at least two pairs of illuminated regions to identify pixels to use in generating the focus measurement signal.

2. The method according to claim 1, further comprising selecting the pixels used in the correlation analysis dynamically and/or adaptively from the illuminated regions.

3. The method according to claim 1, wherein performing the correlation analysis comprises performing a calibration by at least:
   placing a target in a field of view of the phase-detection autofocus system,
   bringing the target into focus, and
   determining a displacement between depictions of the target in the illuminated regions.

4. The method according to claim 3, wherein a direction between the illuminated regions is defined as a first direction and a second direction is defined as being orthogonal to the first direction and in a plane of the image sensor, the method further comprising selecting sets of pixels to be used in the correlation analysis to have a displacement equal to a component of the determined displacement in the second direction.

5. The method according to claim 2, wherein selecting the pixels comprises:
   selecting a first set of pixels and performing the correlation analysis, and
   if a result of the correlation analysis is poor, selecting a second set of pixels and performing the correlation analysis.

6. The method according to claim 2, wherein selecting the pixels comprises:
   for each of a plurality of correlations, performing a correlation analysis between values of a different set of a plurality of sets of pixels in the regions,
   scoring the plurality of correlations, and
   selecting one or more sets of pixels to be used in generating the focus measurement signal.

7. The method according to claim 1, further comprising:
   increasing an effective pixel size by combining adjacent pixels within each illuminated region to accommodate for light conditions, wherein the combining generates values of combined pixels; and
   performing the correlation analysis between the values of the combined pixels in the regions.

8. The method according to claim 1, wherein the correlation is a two-dimensional correlation to determine an image pattern present in the pair of illuminated regions and a displacement between their positions within their respective regions.

9. A phase-detection autofocus system for detecting a focus of a taking lens of a camera, the system comprising:
   a single high-resolution, two-dimensional CMOS image sensor separate from a taking sensor of the camera, the image sensor comprising a single continuous, two-dimensional array of light sensitive pixels, each pixel being associated with an on-chip, light-insensitive storage element;
   optical elements for focusing at least one pair of luminous bundles from the lens onto a corresponding pair of illuminated regions on the image sensor; and
   an evaluation unit configured for:
      performing a correlation analysis between values of pixels in at least two pairs of the illuminated regions to generate a focus measurement signal, wherein a result of the correlation analysis yields a correlation result for each pair of the at least two pairs of illuminated regions, and
      comparing the correlation results from the at least two pairs of illuminated regions to identify pixels to use in generating the focus measurement signal.

10. The phase-detection autofocus system according to claim 9, further comprising:
a CMOS readout circuit configured to determine values of pixels from the illuminated regions from the sensor; and
wherein the evaluation unit is configured for
dynamically and/or adaptively selecting the at least some of the pixels from the illuminated regions to be used in the correlation analysis.

11. The method according to claim 1, further comprising:
determining a first correlation result for a first pair of illuminated regions;
determining that the first correlation result does not satisfy correlation result criteria;
in response to determining that the first correlation result does not satisfy the correlation result criteria, determining a second correlation result for a second pair of illuminated regions;
determining that the second correlation result does satisfy the correlation result criteria; and
selecting pixels from the second pair of illuminated regions to use in generating the focus measurement signal.

12. The method according to claim 1, further comprising:
determining a first weighting for a first pair of illuminated regions based on a first correlation result of the first pair of illuminated regions;
determining a second weighting for a second pair of illuminated regions based on a second correlation result of the second pair of illuminated regions; and
using the first and second weightings to generate the focus measurement signal based on pixels from both of the first and second pairs of illuminated regions.

13. The method according to claim 1, further comprising:
determining a orientation of a line of pixels in each of a first pair of illuminated regions;
determining a second orientation of a line of pixels in each of a second pair of illuminated regions, wherein the second orientation is different from the first orientation; and
generating the focus measurement signal based on pixels from both of the first and second pairs of illuminated regions.

14. The method according to claim 1, further comprising combining values from adjacent pixels within each illuminated region to compensate for low lighting conditions.

* * * * *